(12) United States Patent
Uchiyama et al.

(10) Patent No.: US 6,781,072 B2
(45) Date of Patent: Aug. 24, 2004

(54) CONSTRUCTION OF ON-VEHICLE LEVER SWITCH

(75) Inventors: Norio Uchiyama, Tokyo (JP); Toshiaki Yokoyama, Tokyo (JP)

(73) Assignee: Niles Parts Co., Ltd. (JP)

(*) Notice: Subject to any disclaimer, the term of this patent is extended or adjusted under 35 U.S.C. 154(b) by 81 days.

(21) Appl. No.: 10/303,862

(22) Filed: Nov. 26, 2002

(65) Prior Publication Data

US 2003/0098223 A1 May 29, 2003

(30) Foreign Application Priority Data

Nov. 28, 2001 (JP) .................................. P2001-362961

(51) Int. Cl.[7] .............................................. H01H 9/00
(52) U.S. Cl. .................................................. 200/61.54
(58) Field of Search .......................... 200/4, 17 R, 18, 200/61.54, 335

(56) References Cited

U.S. PATENT DOCUMENTS

| | | | | |
|---|---|---|---|---|
| 6,011,225 A | * | 1/2000 | Yokoyama | 200/61.27 |
| 6,260,431 B1 | * | 7/2001 | Yokoyama | 74/469 |
| 6,441,327 B1 | * | 8/2002 | Shibata et al. | 200/61.27 |
| 6,518,524 B1 | * | 2/2003 | Brandt et al. | 200/61.54 |

FOREIGN PATENT DOCUMENTS

JP          HEI 10-12100          1/1998

* cited by examiner

Primary Examiner—Michael A. Friedhofer
(74) Attorney, Agent, or Firm—Rader, Fishman & Grauer PLLC (57) ABSTRACT

Disclosed is a lever switch being capable of providing predetermined electrical operational instructions by rotating the first rotary knob 3 and the second rotary knob 5 about the axis respectively, characterized in that a first detent mechanism 21 is provided on the distal side of the control lever 1 for providing detention against rotational operation of the second rotary knob 5, a lever guide 19 formed with a lever guide hole 20 is provided on the control lever 1, a lever shaft 39 extending from the distal side to the proximal side of the control lever 1 is disposed in the lever guide hole 20, the first rotary knob 3 is connected to the distal side of the lever shaft 39, a control rod 43 is provided for providing the electrical operational instructions on the proximal side of the lever shaft 39, and a second detent mechanism for providing detention against the rotational operation of the first rotary knob 3 is provided between the proximal side of the lever guide 19 and the control rod 43. The lever switch enables prevention of malfunction of the first and second rotary knobs while downsizing.

8 Claims, 5 Drawing Sheets

CONSTRUCTION OF ON-VEHICLE LEVER SWITCH

BACKGROUND OF THE INVENTION

1. Field of the Invention

The present invention relates to a construction of an on-vehicle lever switch for providing operational instructions, for example, for turning a headlamp of a vehicle ON and OFF.

2. Description of the Related Art

As a construction of an on-vehicle lever switch in the related art, there is the one disclosed for example in JP-A-10-12100. The construction of the on-vehicle lever switch includes a control lever attached on a steering column for providing electrical operational instructions, for example, for turning the headlamp of the vehicle ON and OFF, and the control lever includes control knobs as rotary knobs disposed on the distal side thereof with a knob middle as a fixed knob interposed therebetween.

The aforementioned knob middle is formed with detent troughs on both axial end surfaces thereof, and a detent ball supported on each control knob is in resilient contact with each detent trough by an urging force of a detent spring. A projection formed on the control knob engages a hole on the knob middle to construct a stopper to limit the rotary movement of the control knob.

Lighting operation such as turning the headlamp ON and OFF is performed by operating such control knobs. During such rotary operation, the detent ball on each control knob is brought into resilient contact with the detent trough on the knob middle to provide detention to the control knob. The limit of rotary movement of the control knob may be determined by abutment of the projection on the control knob against the end of the hole on the knob middle in the rotational direction.

However, in the construction described above, when the control knob is rotated strongly to the limit of movement, the other control knob that is not operated may slightly rotate in conjunction with the rotation of the operated control knob. In other words, when one of the control knobs is rotated strongly to the limit of movement, the projection thereof abuts against the end of the hole on the knob middle, and thus the fixed knob middle is displaced in the direction of rotation due to axial deflection of resin. As a consequent, a rotational force is transmitted via the detent ball in resilient contact with the detent trough of the knob middle and the detent spring to the other control knob that is not operated, and thus the control knob that is not operated may rotate together in the direction of rotation.

Generally, since such coupled rotation of the control knobs may result in malfunction of switches, shank or the like is thickened to increase rigidity of the fixed side so as to prevent rotational displacement of the fixed knob middle from occurring when one of the control knobs is operated.

However, there is a problem that taking such countermeasure as to increase rigidity of the fixed side results in thickening and hence upsizing of the entire lever switch.

SUMMARY OF THE INVENTION

Accordingly, it is an object of the present invention to provide a construction of on-vehicle lever switch that may prevent coupled movement of the knobs without upsizing the lever switch.

A first aspect of the invention is a lever switch including a first rotary knob and a second rotary knob disposed on the distal side of a control lever and being capable of providing predetermined electrical operational instructions by rotating the first rotary knob and the second rotary knob about the axis respectively, wherein a first detent mechanism is provided for providing detention against rotational operation of one of the first and second rotary knobs on the distal side of the control lever, a lever guide formed with a lever guide hole is provided on the control lever, a lever shaft extending from the distal side to the proximal side of the control lever is disposed in the lever guide hole, the other one of the first and second rotary knobs is connected to the distal side of the lever shaft, a control rod is provided for providing the electrical operational instructions on the proximal side of the lever shaft, and a second detent mechanism for providing detention against the rotational operation of the other one of the first and second rotary knobs is provided between the proximal side of the lever guide and the control rod.

A second aspect of the invention is a construction of an on-vehicle lever switch as set forth in the first aspect of the invention, wherein the second detent mechanism includes a detent body and a detent spring supported on the control lever and a detent groove formed on the control rod, the control rod includes an engaging section for enabling the electrical operational instructions and a notched section for enabling insertion of the lever shaft along the axial center of the lever guide hole in addition to the detent groove, and a locking section with which the notched side of the control rod engages by an urging force of the detent spring exerted by rotating the control rod in one direction about the axis is provided on the proximal side of the lever guide.

A third aspect of the invention is a construction of an on-vehicle lever switch as set forth in the first aspect or the second aspect of the invention, wherein a stopper for determining the limit of rotation of the control rod by allowing the notched side of the control rod to be abutted when the control rod is rotated is provided on the proximal side of the lever guide.

A fourth aspect of the invention is a construction of an on-vehicle lever switch as stated any one of the second aspect and the third aspect of the invention, wherein a mounting space being in communication with the lever guide hole for arranging the control rod is provided on the proximal side of the lever guide, and a locking hole with which the notched side of the control rod engages to form the locking section and having the stopper is formed on one side of the mounting space intersecting the axial center of the lever guide hole.

A fifth aspect of the invention is a construction of on-vehicle lever switch as set forth in any one of the first aspect to the fourth aspect of the invention, wherein the first rotary knob and the second rotary knob are disposed on the distal side of the control lever with the immovable fixed body interposed therebetween, and the first detent mechanism includes the detent body and the detent spring provided on one of the first and second rotary knobs or on the fixed body, and the detent groove formed on the other one of the first and second rotary knobs with which the detent body is brought into resilient contact by an urging force of the detent spring.

In the first aspect of the invention, the first rotary knob and the second rotary knob are disposed on the distal side of the control lever, and prescribed electrical operational instructions, for example, for turning the headlamp ON and OFF, and turning the fog lamp ON and OFF may be provided by rotating the first rotary knob and the second rotary knob about the axis. When rotating one of the first and second rotary knobs, detention against the rotational operation may be provided by the first detent mechanism.

In the rotational operation of the other one of the first and second rotary knobs, the control rod on the distal side is operated via the lever shaft extending in the lever guide hole from the distal side to the proximal side of the control lever, and a movable element provided with a movable contact point is moved in conjunction therewith, so that the electrical operational instructions, for example, for turning the headlamp ON and OFF may be provided. When rotating the other one of the first and second rotary knobs, detention may be provided by the second detent mechanism provided between the proximal side of the lever guide and the control rod.

As is described above, since the first detent mechanism for providing detention against the rotational operation of one of the first and second rotary knobs is provided on the distal side of the control lever, and the second detent mechanism for providing detention against the rotational operation of the other one of those is provided on the proximal side of the control lever, the first and second detent mechanisms may be prevented from working with each other in the direction of rotation, and thus coupled rotation such that rotation of one of the first and second rotary knobs to the limit causes rotation of the other one of those may be prevented. Therefore, malfunction of one of the first and second rotary knobs caused by the operation of the other one of those may be prevented while downsizing the entire control lever without increasing rigidity of the entire control lever.

In second aspect of the invention, in addition to the effect of the invention as set forth in the first aspect of the invention, the second detent mechanism includes the detent body and the detent spring supported on the control lever, and the detent groove formed on the control rod, and is able to provide detention against the rotational operation reliably by resilient contact of the detent body urged by the detent spring with the detent groove on the control rod on the occasion of rotating the other one of the first and second rotary knobs.

Since the control rod also includes the engaging section that enables the electrical operational instructions, and the notched section that enables insertion of the lever shaft along the axial center of the lever guide hole in addition to the detent groove, the lever shaft can easily be inserted and assembled along the axial center of the lever guide hole on the occasion of assembly.

In this case, by rotating the control rod in one direction about the axis, the notched side of the control rod may be engaged with the locking section provided on the proximal side of the control lever by an urging force of the detent spring. Therefore, in this state of engagement, the lever shaft and the control rod do not project and drop out from the lever guide hole due to an urging force of the detent spring even when the operator unlinks hands, and thus assembly may be performed quite easily.

In the third aspect of the invention, in addition to the effect of the invention as set forth in the first or second aspect of the invention, when the other one of the first and second rotary knobs is rotated, the rotation can be constrained by abutment of the notched side of the control rod to the stopper provided on the proximal side of the lever guide at the limit of rotation, and thus the rotational operation of the other one of the first and second rotary knobs may be reliably performed.

In this case, since the first and second detent mechanisms do not work together in the direction of rotation, even when the other one of the first and second rotary knobs rotates and displaces over the limit due to the axial deflection caused by abutment of the notched side of the control rod to the stopper, one of the first and second rotary knobs does not rotate together, and thus malfunction can reliably be prevented.

In the fourth aspect of the invention, in addition to the effect of the invention as set forth in the second or third aspect of the invention, since the mounting space in communication with the lever guide hole is provided on the proximal side of the lever guide, the control rod may be disposed in the mounting space. Since the locking hole is formed on one side of the mounting space intersecting the axial center of the lever guide hole, the notched side of the control rod may be engaged with the locking hole via an urging force of the detent spring of the second detent mechanism by rotating the control rod in one direction about the axis, thereby reliably preventing dropping out of the lever shaft and the control rod when assembling.

Since the aforementioned locking hole is provided with the stopper, when the control rod is rotated to the limit, the notched side of the control rod can reliably be abutted to the stopper, and thus the other one of the first and second rotary knobs may reliably be positioned at the limit of rotation, thereby enabling precise operation.

In the fifth aspect of the invention, in addition to the effect of the invention as set forth in any one of the first to fourth aspects of the invention, since the first rotary knob and second rotary knob are disposed on the distal side of the control lever with the immovably mounted fixed knob interposed therebetween and thus the detent body provided on one of the first and second rotary knobs or on the fixed knob is brought into resilient contact with the detent groove formed on the other one of those by an urging force of the detent spring when rotating one of the first and second rotary knobs, detention against the rotational operation of the first and second rotary knobs may reliably be provided.

DESCRIPTION OF THE PREFERRED EMBODIMENTS

Figure 1:
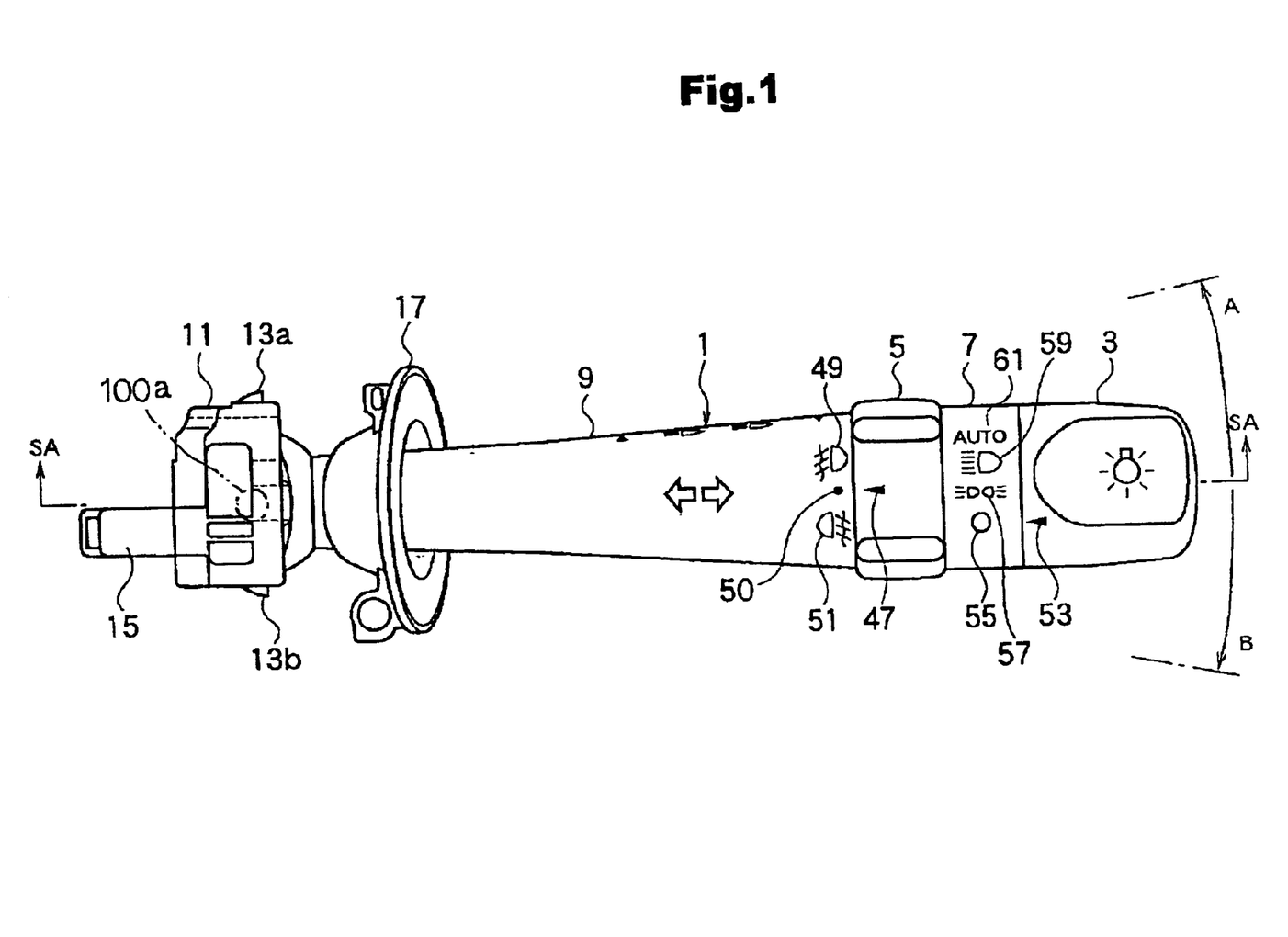
FIG. 1 is a plan view of a control lever according to an embodiment of the present invention.
Figure 2:
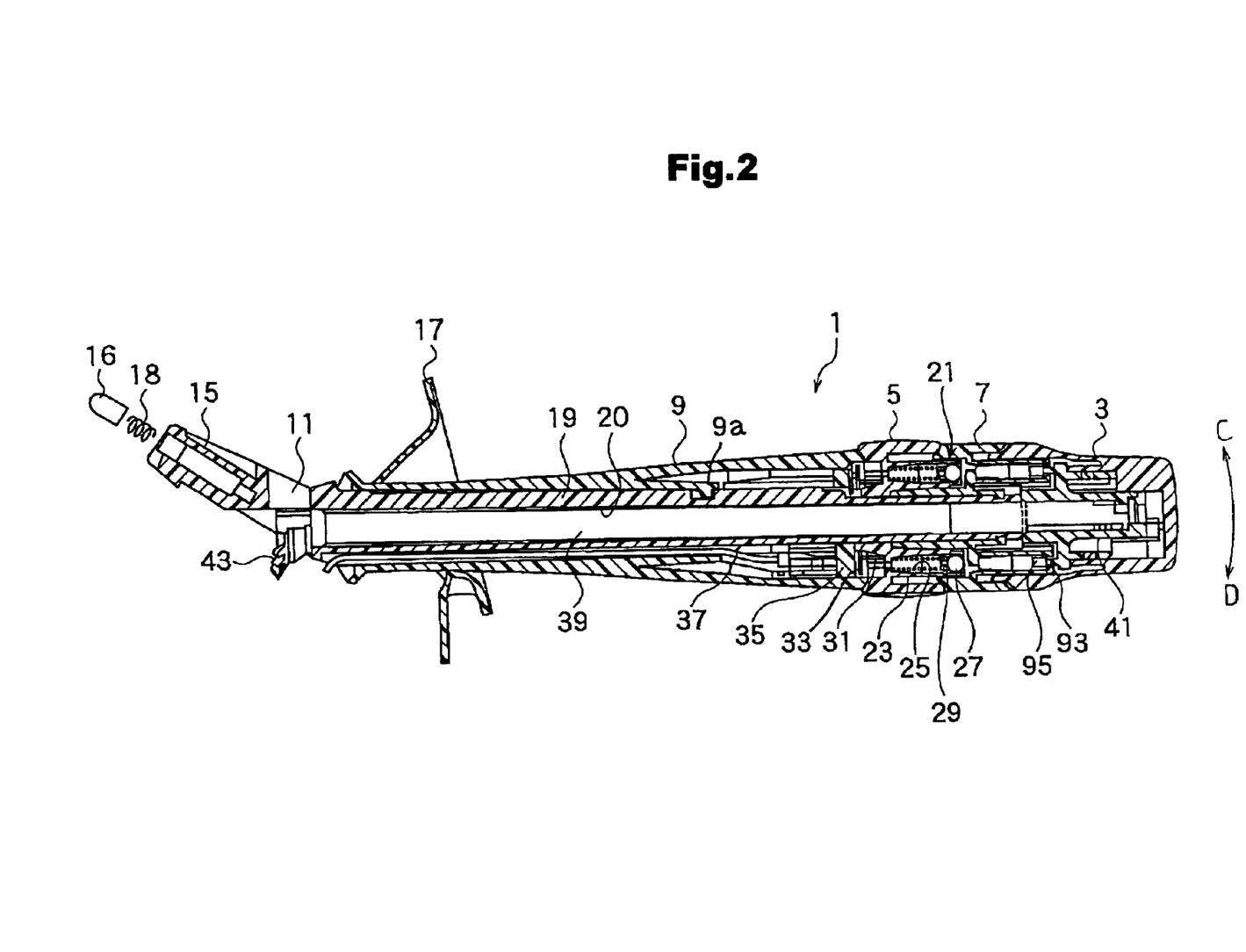
FIG. 2 is a cross sectional view taken along the line SA—SA in FIG. 1 according to the embodiment.
Figure 3:
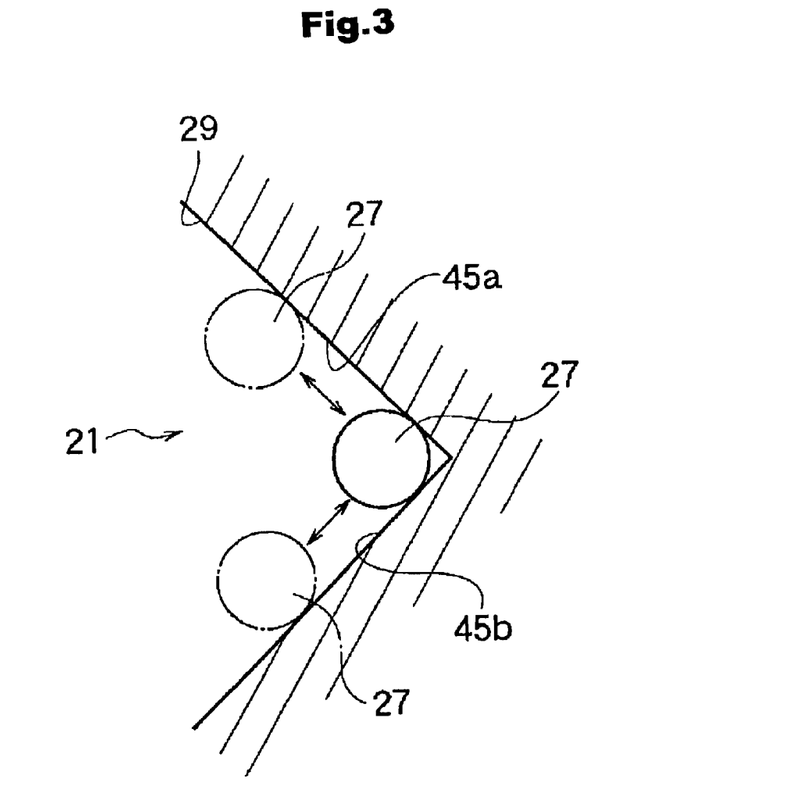
FIG. 3 is a cross sectional view of the principal portion of a first detent mechanism according to the embodiment.
Figure 4:
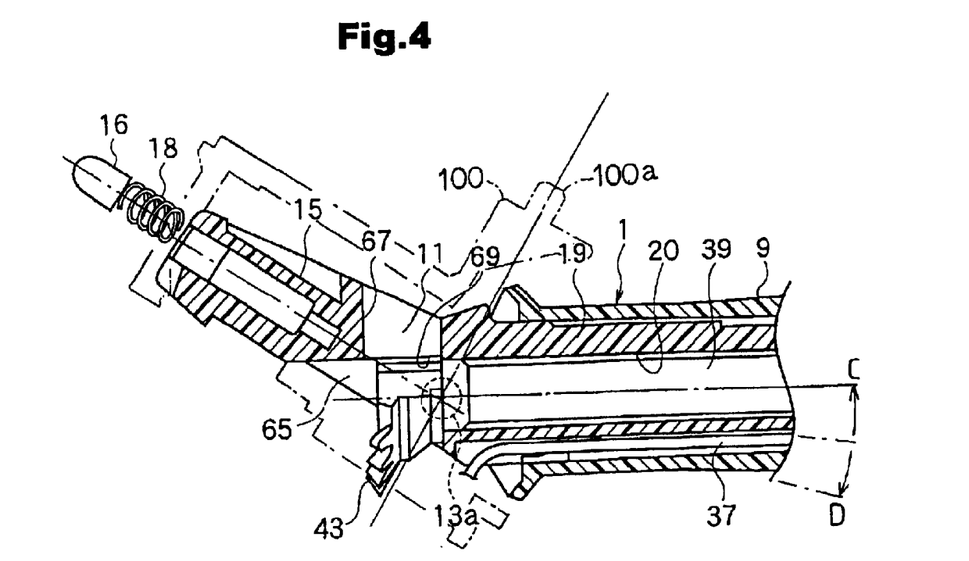
FIG. 4 is an enlarged cross sectional view showing the proximal side of the control lever according to the embodiment.
Figure 5:
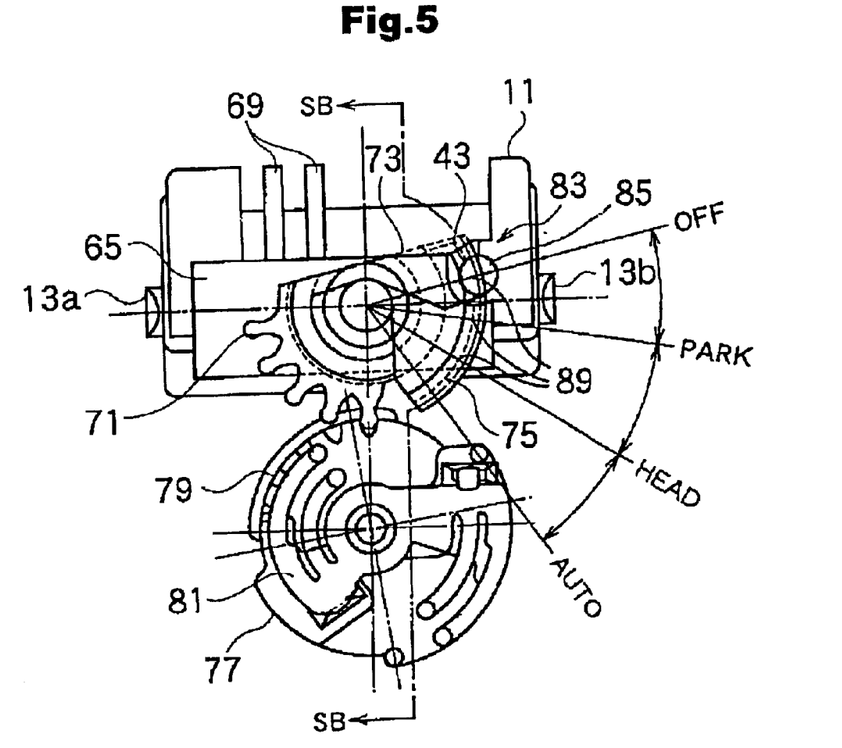
FIG. 5 is a side view of the control lever and a movable element according to the embodiment.
Figure 6:
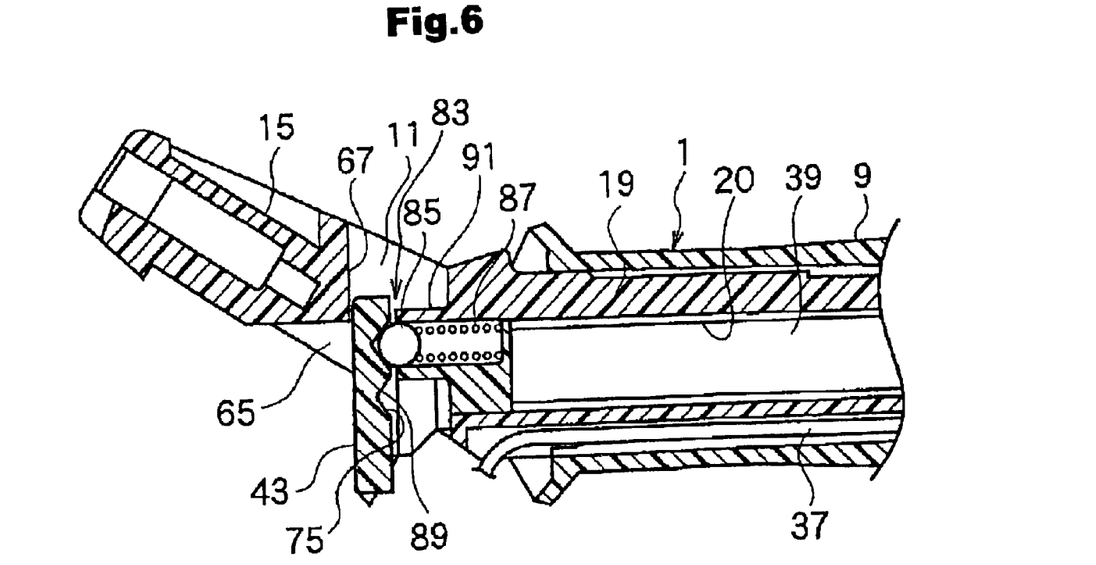
FIG. 6 is a an enlarged cross sectional view showing a second detent mechanism on the proximal side of the control lever when viewed in the directions indicated by the arrows SB—SB in FIG. 5 according to the embodiment.
Figure 7:
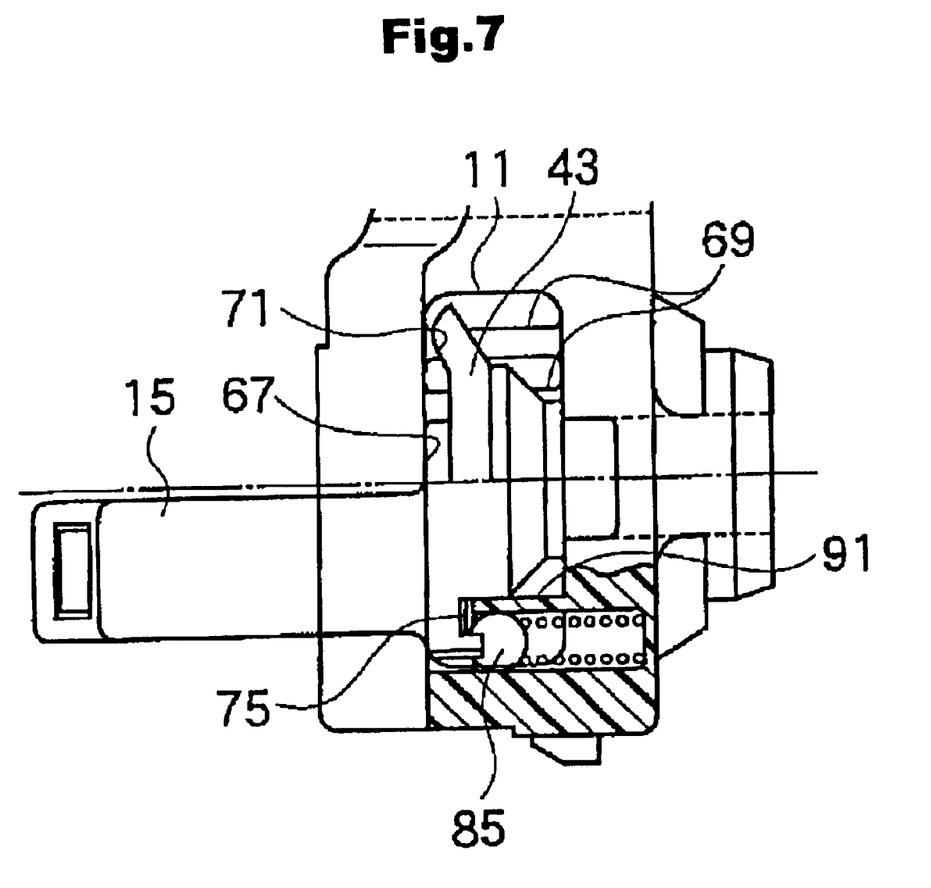
FIG. 7 is an enlarged plan view showing the second detent mechanism on the proximal side of the control lever according to the embodiment.

FIG. 1 to FIG. 6 relate to an embodiment of the present invention, in which FIG. 1 is a front view of a control lever of a lever switch, FIG. 2 is a cross sectional view taken along the line SA—SA in FIG. 1, FIG. 3 is a cross sectional view of a principal portion of a first detent mechanism, FIG. 4 is an enlarged cross sectional view showing a distal side of the control lever, FIG. 5 is an enlarged front view showing the distal side of the control lever with a movable element, FIG. 6 is an enlarged cross sectional view of the distal side of the control lever when viewed in the directions indicated by the arrows SB—SB in FIG. 4, and FIG. 7 is a partially exploded enlarged plan view showing the distal side of the control lever.

A structure of an on-vehicle lever switch according to an embodiment of the present invention relates to an on-vehicle combination switch as a lever switch, which is mounted on the steering column via a case, not shown, to be mounted on the proximal side of a control lever 1 and a body to be mounted on the steering column, for example, on the right side of a right hand drive car. When it is used for a left hand drive car, it is applicable only by forming the control lever 1 and the like in the symmetrical configuration. Though it is not shown in the figure, the body includes a cylindrical pipe for inserting the steering shaft at the center thereof, so that the case is inserted therethrough from the right side and attached on the right side, and is secured on the steering column with a screw.

The control lever 1 is used for providing a predetermined electrical operational instructions, and includes, for example, a turn signal switch, a lighting switch for turning the head light ON and OFF, a main-dimmer changeover switch, a passing switch, a fog lamp switch for turning a fog lamp ON and OFF. The control lever 1 includes a lever shaft 39, a first rotary knob 3 provided at the distal end of the lever shaft 39, a lever guide 19 for rotatably supporting the lever shaft 39, a lever portion 9 and a fixed knob 7 fitted on the lever guide 19, and a second rotary knob 5 rotatably fitted on the lever guide 19, and is capable of pivoting from front to back and side to side.

As is shown in FIG. 1, the control lever 1 of the combination switch includes the first rotary knob 3 and the second rotary knob 5 on the distal side thereof so as to be capable of rotating about the axis. The first rotary knob 3 and the second rotary knob 5 are disposed with a fixed knob 7 on the fixed side that is not capable of rotating about the axis interposed therebetween as shown in FIG. 2. The control lever 1 is provided with the lever portion 9 on the fixed side that is not capable of rotating about the axis adjacent to the second rotary knob 5, and the lever portion 19 rotatably supporting the second rotary knob 5 is fixed in the lever portion 9 by means of a resilient locking strip 19a. The fixed knob 7 must simply be a fixed body that does not rotate with respect to the first and second rotary knobs 3, 5, and thus it may be disposed so as to be hidden in the first or the second rotary knob 3, 5.

Provided on the proximal side of the lever guide 19 of the control lever 1 is a control rod mounting unit 11. On the outer surface of the control rod mounting unit 11, there are provided a pair of shanks 13a, 13b projected therefrom and rotatably supported by a movable plate 100 that is rotatably supported by the case. The control lever 1 pivots in the directions indicated by the arrows C and D about the shanks 13a, 13b, and pivots in the directions indicated by the arrows A and B about a shaft 100a of the movable plate 100. The control rod mounting unit 11 is further provided with a detent body supporting unit 15 projected therefrom.

As shown in FIG. 1 and the figure, a boot 17 is mounted on the proximal side of the lever portion 9. The boot 17 is formed into a substantially horn shape, and is mounted on the case so that the interior of the case and the like in which the proximal side of the control lever 1 is mounted cannot be viewed from the occupant.

The control lever 1 of the combination switch has a function of a turn signal switch for flashing the turn signal by its pivotal movement in the directions indicated by the arrows A, B about the shank 100a of the movable plate 100 as shown in FIG. 1. The control lever 1 has also a function of a main-dimmer changeover switch and a passing switch by its pivotal movement in the directions indicated by the arrows C, D about the shanks 13a, 13b of the lever portion 9 as shown in FIG. 4.

The first rotary knob 3 has a function of a lighting switch for turning the headlamp and the side marker lamp ON and OFF by being rotated about the axis. The second rotary knob 5 has a function of a fog lamp switch for turning the fog lamp on the front side or on the rear side ON and OFF by being rotated about the axis.

Therefore, the first rotary knob 3 is provided with a triangle mark 53 that serves as a mark for rotational operation as shown in FIG. 1, and the fixed knob 7 is provided with a mark 55 indicating the position for turning the headlamp OFF, a mark 57 indicating the position for turning a parking lamp ON, a mark 59 indicating the position for turning the headlamp ON, and characters (AUTO) 61 indicating the position for allowing the headlamp to be automatically turned ON and OFF. The second rotary knob 5 is provided with a triangle mark 47 that serves as a mark for rotational operation, and the lever portion 9 is provided on its surface adjacent to the second rotary knob 5 with a mark 49 indicating the position for turning the front fog lamp ON, a mark 50 indicating the neutral position, and a mark 51 indicating the position for turning the rear fog lamp ON.

The cross section of the control lever 1 is as shown in FIG. 2. The control lever 1 has the lever guide 19 fixed in the lever portion 9. The lever guide 19 extends from the distal side to the proximal side of the control lever 1. The lever guide 19 is formed with a lever guide hole 20 passing through the axle center thereof.

The lever portion 9 is, as shown in FIG. 2, opened in the horn shape so that the distal end thereof almost matches the diameter of the second rotary knob 5, and is fixedly mounted by engaging the resilient locking strip 9a formed in the opening thereof along the lever guide 9 with the groove formed on the outer periphery of the lever guide 19. The fixed knob 7 clamps the second rotary knob 5 rotatably fitted in the lever shaft 39 with the lever portion 9 so as not to move in the axial direction by being fixedly mounted on the outer periphery of the distal side of the lever guide 19.

The second rotary knob 5 disposed between the fixed knob 7 and the lever portion 9 is rotatably supported on the outer peripheral surface of the lever guide 19 on the distal side. Provided between the second rotary knob 5 and the fixed knob 7 is a first detent mechanism 21 for providing detention against the rotational operation of the second rotary knob 5. Therefore, it is constructed in such a manner that the first detent mechanism 21 for providing detention against the rotational operation of the second rotary knob 5, which is one of the first and second rotary knobs 3, 5, is provided on the distal side of the control lever 1.

The first detent mechanism 21 includes a detent body 27 supported by a detent body supporting unit 23 provided on the second rotary knob 5 via a detent spring 25. The detent spring 25 is formed of a coil spring, and the detent body 27 is formed of a steel ball. The detent body 27 is in resilient contact with a detent groove 29 formed on the fixed knob 7 via an urging force of the detent spring 25.

A movable contact plate 33 is supported on the second rotary knob 5 via a contact spring 31 formed of a coil spring.

A polar plate 35 is fixed on and supported by the laver guide 19 adjacent to the movable contact plate 33, and is fitted into the opening on the lever portion 9. The polar plate 35 is formed with a fixed contact by insert molding so as to be exposed on the plate surface. When the contact point of the movable contact plate 33 comes into contact with the plate surface of the polar plate 35 formed with the fixed contact point by insert molding, and the movable contact plate 33 is moved in conjunction with the rotational operation of the second rotary knob 5, the contact portion of the movable contact plate 33 comes into contact with the fixed contact point on the polar plate 35 and the operational signals are issued.

The polar plate 35 is connected with a lead 37 and is connected to the fixed contact point in a conducting state. The lead 37 passes between the lever portion 9 and the lever guide 19 and drawn into the proximal side of the control lever 1, and is connected to the circuit for turning the fog lamps on the front side and on the rear side ON and OFF.

The lever shaft 39 is rotatably fitted into the lever guide hole 20 on the lever guide 19. The lever shaft 39 is disposed in the lever guide hole 20 so as to extend straightly from the distal side to the proximal side of the control lever 1. A joint member 41 is fixedly mounted on the distal side of the lever shaft 39. The first rotary knob 3 is fixedly mounted on the joint member 41. Therefore, it is constructed in such a manner that the lever guide 19 having the lever guide hole 20 is provided on the control lever 1 and the lever shaft 39 is disposed in the lever guide hole 20 so as to extend from the distal side to the proximal side of the control lever 1.

There is no detent mechanism provided between the first rotary knob 3 and the fixed knob 7, so that the first rotary knob 3 is adapted to be capable of rotating freely with respect to the fixed knob 7. In other words, a tubular projection 93 of the joint member 41 that is to be mounted in a state in which the first rotary knob 3 is fixed is fitted into a notched section 95 formed on the distal side of the fixed knob 7, so that the fixed knob 7 and the joint member 41 on the first rotary knob 3 do not engage with each other in the direction of rotation at the projection 93 and the notched section 95.

A control rod 43 is provided on the proximal side of the lever shaft 39.

The relation between the detent body 27 and the detent groove 29 of the first detent mechanism 21 is as shown in FIG. 3, and the detent groove 29 is formed into V-shape defined by a pair of inclined surfaces 45a, 45b. Therefore, when the second rotary knob 5 is rotated and aligned with the mark 49, the detent body 27 moves upward on the inclined surface 45a, and a part of the second rotary knob 5 abuts against the stopper on the fixed knob 7 at the midpoint thereof, thereby preventing further rotation of the second rotary knob 5. When the second rotary knob 5 is released at this position, the detent body 27 moves downward on the inclined surface 45a by an urging force of the detent spring 25, and is automatically restored to the trough of the detent groove 29, thereby restoring the second rotary knob 5 automatically to the neutral position where the triangle mark 47 points the mark 50. In contrast to it, when the second rotary knob 5 is rotated in the opposite direction to the position where the triangle mark 47 points the mark 51, the detent body 27 moves upward on the inclined surface 45b and a part of the second rotary knob 5 likewise abuts against the stopper on the fixed knob 7 at the midpoint thereof, thereby preventing further rotation. When the second rotary knob 5 is released at this point, the second rotary knob 5 is automatically restored to the neutral position where the triangle mark 47 points the mark 50 in the same manner as described above.

A detent body 16 is supported by the detent body supporting unit 15 via a detent spring 18. The detent body 16 is in resilient contact with the detent groove on the case.

The control rod mounting unit 11 is provided with a mounting space 65 being in communication with the lever guide hole 20 as shown in FIG. 4 and FIG. 5. On one side of the mounting space 65 intersecting the axial center of the lever guide hole 20, the control rod mounting unit 11 is provided with a locking hole 67 as a locking section with which the notched side of the control rod 43 that will be described later engages by being applied with an urging force of the detent spring that will also be described later when the control rod 43 is rotated in one direction about the axis during assembling the control rod 43. In the present embodiment, the locking hole 67 is provided so as to be orthogonal to the axial center of the lever guide hole 20.

The control rod mounting unit 11 is further provided in the locking hole 67 with a stopper 69 that determines the rotational limit of the control rod 43 when being is rotated. In other words, it is constructed in such a manner that the stopper 69 against which the notched side of the control rod 43 that will be described later abuts when the control rod 43 is rotated is provided on the proximal side of the lever guide 19. It is also constructed in such a manner that the notched side of the control rod 43 that will be described later is fitted into one side of the mounting space 65 so as to intersect the axial center of the lever guide hole 20 to construct the locking section, and the locking hole 67 having the stopper 69 is provided.

The control rod 43 includes an engaging section 71 in the shape of a bevel gear, a notched section 73, and a detent groove forming section 75. The engaging section 71 enables the provision of electrical operational instructions, and engages an engaging section 79 of a movable element 77 rotatably supported by the case. The movable element 77 is provided with a movable contact point 81 formed of conductive metallic leaf spring material. Engagement between the engaging sections 71, 79 enables operation of the control lever 1 in the directions indicated by the arrows C, D in FIG. 2 about the shanks 13a, 13b. The notched section 73 enables insertion of the lever shaft 39 along the axial center of the lever guide hole 20. The notched section 73 is formed by removing the upper portion of the control rod 43 into a substantially sector form in front view.

Provided between such control rod 43 and the proximal side of the lever shaft 39 is a second detent mechanism 83 for providing detention against the rotational operation of the first rotary knob 3. The second detent mechanism 83 includes a detent body 85 and a detent spring 87 supported on the control lever 1 and a detent groove 89 formed on the control rod 43 as shown in FIG. 6 and FIG. 7.

The detent body 85 and the detent spring 87 are supported by the detent body supporting unit 91 provided on the proximal side of the lever guide 19. The detent groove 89 is formed on the detent groove forming section 75 of the control rod 43. There are four detent grooves 89 at the positions corresponding to the position to turn the headlamp OFF, the position to turn the parking light ON, the position to turn the headlamp ON, and the position of AUTO, and they are formed respectively in V-shape in cross section continuously.

When assembling, the boot 17, the lever guide 19, the lead 37, the polar plate 35, the second rotary knob 5, the first detent mechanism 21, the lever shaft 39, the joint member 41, and the fixed knob 7 are assembled sequentially on the lever portion 9. The lever shaft 39 is inserted from the side of the mounting space 65 along the axial center of the lever guide hole 20. On the occasion of insertion, since the notched section 73 exists on the control rod 43, the control rod 43 is not constrained by the control rod mounting unit 11 of the lever guide 19, and thus the lever shaft 39 can be inserted along the axial center of the lever guide hole 20 without problem. Therefore, assembly of the lever shaft 39 may be performed easily.

On the occasion of insertion of the lever shaft 39, the detent body 85 and the detent spring 87 are assembled on the detent body supporting unit 91 in advance. In this state, the detent body 85 is brought into resilient contact with the detent groove 89 on the control rod 43, then the control rod 43 is placed in the mounting space 65 and rotated in one direction about the axis until it comes to the state shown in FIG. 5. This rotation of the control rod 43 allows the notched section 73 to be fitted into the locking hole 67 as shown in FIG. 5. When releasing the hand from the control rod 43 in this state, the control rod 43 is pushed in the axial direction by an urging force of the detent spring 87 via the detent body 85 and the lower side of the notched section 73 engages the wall surface of the locking hole 67.

Therefore, even when hands are unlinked from the control rod 43 and the lever shaft 39 during assembly, the lever shaft 39 does not come off from the lever guide 19, and thus assembly may be carried out easily.

The distal end of the lever shaft 39 inserted into the lever guide hole 20 projects out from the fixed knob 7 in a state in which the lower portion of the notched section 73 of the control rod 43 engages the locking hole 67. The joint member 41 is fixedly put on the projected distal end of the lever shaft 39. The first rotary knob 3 is then fixedly put on the joint member 41 to get the state shown in FIG. 2.

When assembling the first rotary knob 3, the control rod 43 is pushed in the axial direction against the detent spring 87. After assembly, the control rod 43 is held at the position slightly away from the wall surface of the locking hole 67. The detent spring 18 and the detent body 16 are inserted into the detent body supporting unit 15 of the lever guide 19 so as to be rotatably supported by the movable plate 100, and the movable plate 100 is rotatably supported by the case.

When the control lever 1 is operated in the directions indicated by the arrows A, B, in FIG. 1 in the assembled state, the right or the left turn signal may be flashed.

When the first rotary knob 3 is rotated to align the triangle mark 53 with the mark 57, the control rod 43 rotates via the lever shaft 39. This rotation brings the detent body 85 into opposed resilient contact with the detent groove 89 of the position (PARK) corresponding to the parking lamp, and the control rod 43 is positioned. The rotation of the control rod 43 rotates the movable element 77 via the engaging sections 71, 79. This rotation brings the movable contact point 81 into contact with the fixed contact point on the case in a predetermined state, so that the circuit of the parking lamp is closed and thus the parking lamp is illuminated.

In the same manner, when the first rotary knob 3 is rotated to align the triangle mark 53 with the mark 59 or the mark 61, the detent body 85 is brought into opposed resilient contact with the detent groove 89 corresponding to the position for turning the headlamp ON (HEAD) or the detent groove 89 corresponding to the automatic position (AUTO), and then the control rod 43 is positioned.

By the rotation of the control rod 43, the movable element 77 is likewise rotated, and the movable contact point 81 is bought into contact with the fixed contact point on the case in a prescribed state, thereby the headlamp is illuminated, or the headlamp is turned ON and OFF automatically according to the lighting environment outside the car.

By resilient movement of the detent body 85 with respect to the respective detent grooves 89, the first rotary knob 3 may be provided with detention against the rotational operation via the control rod 43, the lever shaft 39, and the joint member 41.

When the operation of the first rotary knob 3 is reversed and the triangle mark 53 is aligned with the mark 55 to turn the headlamp OFF, if the first rotary knob 3 is strongly rotated, the notched section 73 of the control rod 43 abuts against the stopper 69 to stop at the limit, and is constrained from further rotation. Therefore, the detent groove forming section 75 of the control rod 43 does not come off from the detent body 85, and thus the detent body 85 is prevented from dropping out.

In addition, the detent groove forming section 75 may be formed into a sector form elongated in the direction of rotation of the control rod 43. Even when the stroke of the rotary operation of the first rotary knob 3 is increased, the detent groove forming section 75 may be opposed to the detent body 85, whereby the detent body 85 is reliably prevented form being dropped out.

Since the control rod 43 is adapted to rotate and move the movable element 77 by the engaging sections 71, 79, the gear-shaped engaging sections 71, 79 are constantly engaged even when the first rotary knob 3 is rotated to a large extent. Therefore, in comparison with the device in which arm shaped member simply engages the recess on the movable element to linearly move the movable element by the pivotal movement of the arm-shaped member, the movable element 77 can be rotated in an engaged state for a long distance in the direction of rotation of the operating rod 43, whereby the operating stroke of the first rotary knob 3 may be increased. Therefore, the mutual distances of a plurality of fixed contact points on the case that the movable contact point 81 of the movable element 77 come into contact with may be increased, and thus a rotary switch having a number of contact positions may be provided. As a consequent, even when abrasion powder or the like is generated in the case after long time of use, connections between the plurality of fixed contact points in the case cannot easily be short-circuited due to abrasion power or the like, and thus the operational instructions by the first rotary knob 3 may be reliably performed.

When providing such operational instructions by the first rotary knob 3, there may be the case where the lever shaft 39 is deformed under torsion about the axis and the first rotary knob 3 rotates slightly over the limit when the first rotary knob 3 is strongly rotated and the control rod 43 strongly abuts against the stopper 69 as described above. In such a case, excessive rotation of the first rotary knob 3 rotates the joint member 41 slightly about the axis together with the first rotary knob 3. However, since the projection 93 on the joint member 41 rotates relatively in the notched section 95 on the fixed knob 7, rotation of the joint member 41 is not transmitted to the fixed knob 7.

Therefore, the second rotary knob 5 does not rotate in conjunction with the excessive rotation of the first rotary knob 3, and thus malfunction of the second rotary knob 5 due to strong rotational operation of the first rotary knob 3 may be prevented.

The second rotary knob 5 repeats turning the fog lamp on the front side or the fog lamp on the rear side ON and OFF every time the triangle mark 47 is aligned with the mark 49 or 51 by its rotational operation.

When the second rotary knob 5 is strongly operated, a part of the second rotary knob 5 abuts against the stopper of the fixed knob 7. At this time, there is a case in which a rotational force about the axis is transmitted to the distal side of the lever guide 19 via the fixed knob 7, and thus the distal side of the lever guide 19 is twisted, whereby the fixed knob 7 is slightly rotated. In such a case as well, the projection 93 on the joint member 41 on the first rotary knob 3 rotates relatively by the presence of the notched section 95 on the fixed knob 7, and thus the rotation of the fixed knob 7 is not transmitted to the first rotary knob 3. Therefore, even when the second rotary knob 5 is strongly operated, the rotation thereof is not transmitted to the first rotary knob 3, and thus malfunction of the first rotary knob 3 may be prevented.

Since the malfunction of the first and second rotary knobs 3, 5 may be prevented in this manner, deformation of the lever shaft 39 or the lever guide 19 under torsion may be allowed to some extent, and thus total downsizing by reducing the diameter of the lever shaft 39 or reducing the thickness of the lever guide 19 may be possible.

Since the detent groove 89 is formed on the control rod 43 which is integrally formed with the lever shaft 39, detention by the detent groove 89 and the detent body 85 may be transmitted directly to the first rotary knob 3 via the lever shaft 39, and thus rattling of the first rotary knob 3 may be prevented.

Though the first rotary knob 3 is adapted to provide operational instructions for turning the headlamp ON and OFF, and the second rotary knob 5 is adapted to provide operational instructions for turning the fog lamp ON and OFF in the above-described embodiment, the functions of the first and second rotary knobs 3, 5 may be selected as desired. For example, it is also possible to adapt the first rotary knob 3 to provide operational instructions for controlling wiper volume, and the second rotary knob 5 to provide operational instructions for switching the rear wiper washer.

Though the control rod 43 is provided with the engaging section 79, it is also possible to employ an arm member to engage the movable element on the case instead of the engaging section 79 to allow the linear movement of the movable element.

Though the stopper 69 is adapted to limit the rotation of the first rotary knob 3 when it is strongly operated toward the OFF side, it is also possible to further provide a stopper for limiting the rotation of the first rotary knob 3 when it is strongly operated toward the AUTO side. The stopper 69 may also be omitted.

The locking hole 67 with which the control rod 43 is engaged at the time of assembly is not limited to a through hole, and it may be a bottomed hole. The locking structure does not have to be a hole, and it may be constructed by a flexible claw or the like. When employing the flexible claw projecting into the mounting space 65, it is thrust away by the control rod 43 and thus is out of the mounting space 65 at the time of assembly. However, when the control rod 43 is disposed in the mounting space 65, the claw is resiliently restored into the mounting space 65 and thus locks the control rod 43 from being dislocated.

What is claimed is:

1. A construction of an on-vehicle lever switch comprising:

a first rotary knob and a second rotary knob disposed on a distal side of a control lever and being capable of providing predetermined electrical operational instructions by rotating said first rotary knob and the second rotary knob about an axis respectively;

a first detent mechanism on the distal side of said control, lever for providing detention against rotational operation of one of said first and second rotary knobs;

a lever guide formed with a lever guide hole being provided on said control lever;

a lever shaft extending from the distal side to a proximal side of said control lever and being disposed in said lever guide hole, the other one of said first and second rotary knobs being connected to a distal side of said lever shaft;

a control rod for providing said electrical operational instructions on a proximal side of the lever shaft; and a second detent mechanism for providing detention against the rotational operation of the other one of said first and second rotary knobs between a proximal side of said lever guide and said control rod.

2. A construction of an on-vehicle lever switch according to claim 1, wherein said second detent mechanism includes a detent body and a detent spring supported on said control lever and a detent groove formed on said control rod, said control rod includes an engaging section for enabling said electrical operational instructions and a notched section for enabling insertion of said lever shaft along the axial center of said lever guide hole in addition to the detent groove, and a locking section with which the notched section of the control rod engages by an urging force of said detent spring exerted by rotating said control rod in one direction about the axis is provided on the proximal side of said lever guide.

3. A construction of an on-vehicle lever switch according to claim 2, wherein a stopper for determining the limit of rotation of the control rod by allowing the notched side of the control rod to be abutted when said control rod is rotated is provided on the proximal side of said lever guide.

4. A construction of an on-vehicle lever switch according to claim 2, wherein a mounting space being in communication with said lever guide hole for arranging said control rod is provided on the proximal side of said lever guide, and a locking hole with which the notched section and of said control rod engages to form said locking section and having said stopper is formed on one side of said mounting space intersecting the axial center of said lever guide hole.

5. A construction of on-vehicle lever switch according to any one of claims 1 and 2, wherein said first rotary knob and the second rotary knob are disposed on the distal side of said control lever with an immovable fixed body interposed therebetween, and said first detent mechanism includes a detent body and a detent spring provided on one of said first and second rotary knobs or on said fixed body, and a detent groove formed on the other one of the first and second rotary knobs with which said detent body is brought into resilient contact by an urging force of said detent spring.

6. A construction of an on-vehicle lever switch according to claim 3, wherein a mounting space being in communication with said lever guide hole for arranging said control rod is provided on the proximal side of said lever guide, and a locking hole with which the notched section of said control rod engages to form said locking section and having said stopper is formed on one side of said mounting space intersecting the axial center of said lever guide hole.

7. A construction of on-vehicle lever switch according to claim 3, wherein said first rotary knob and the second rotary knob are disposed on the distal side of said control lever with an immovable fixed body interposed therebetween, and said first detent mechanism includes a detent body and a detent spring provided on one of said first and second rotary knobs or on said fixed body, and a detent groove formed on the other one of the first and second rotary knobs with which said detent body is brought into resilient contact by an urging force of said detent spring.

8. A construction of on-vehicle lever switch according to claim 4, wherein said first rotary knob and the second rotary knob are disposed on the distal side of said control lever with an immovable fixed body interposed therebetween, and said first detent mechanism includes a detent body and a detent spring provided on one of said first and second rotary knobs or on said fixed body, and a detent groove formed on the other one of the first and second rotary knobs with which said detent body is brought into resilient contact by an urging force of said detent spring.

* * * * *